US011852890B2

(12) United States Patent
Eash et al.

(10) Patent No.: US 11,852,890 B2
(45) Date of Patent: Dec. 26, 2023

(54) NEAR-EYE DISPLAY SYSTEM

(71) Applicant: Avegant Corp., San Mateo, CA (US)

(72) Inventors: Aaron Matthew Eash, San Francisco, CA (US); Allan Thomas Evans, San Francisco, CA (US); Andrew John Gross, Redwood City, CA (US); D. Scott Dewald, Dallas, TX (US); Eamon Han O'Connor, Emeryville, CA (US); Forrest Foust, Sunnyvale, CA (US); Warren Cornelius Welch, III, Foster City, CA (US)

(73) Assignee: Avegant Corp., San Mateo, CA (US)

( * ) Notice: Subject to any disclaimer, the term of this patent is extended or adjusted under 35 U.S.C. 154(b) by 98 days.

(21) Appl. No.: 17/303,480

(22) Filed: May 28, 2021

(65) Prior Publication Data

US 2021/0289193 A1    Sep. 16, 2021

Related U.S. Application Data

(63) Continuation of application No. 16/253,140, filed on Jan. 21, 2019, now Pat. No. 11,025,893, which is a (Continued)

(51) Int. Cl.
*G02B 7/06* (2021.01)
*G02F 1/01* (2006.01)
(Continued)

(52) U.S. Cl.
CPC .............. *G02B 7/06* (2013.01); *G02B 17/023* (2013.01); *G02F 1/0136* (2013.01); *H04N 13/383* (2018.05); *H04N 13/344* (2018.05)

(58) Field of Classification Search
CPC .. H04N 13/344; H04N 13/383; H04N 9/3105; H04N 9/315; G02B 17/023; G02B 27/017; G02B 26/001; G02B 26/0841; G02B 26/02; G02F 1/0136; G02F 1/01; G02F 1/13363; G03B 35/18; G03B 35/26; G03B 21/2073; G02C 7/101; G02C 7/12; G09G 3/3466; G09G 3/207
See application file for complete search history.

(56) References Cited

U.S. PATENT DOCUMENTS 3,586,416 A    6/1971 De
3,856,407 A    12/1974 Takeda et al.
(Continued)

FOREIGN PATENT DOCUMENTS

CN    1910499 A    2/2007
CN    102566049 A    7/2012
(Continued)

OTHER PUBLICATIONS

Office Action, EP App. No. 17840389.5, dated Oct. 11, 2022, 5 pages.
(Continued)

*Primary Examiner* — Darryl J Collins
*Assistant Examiner* — Tamara Y. Washington
(74) *Attorney, Agent, or Firm* — Nicholson De Vos Webster & Elliott LLP; Judith Szepesi

(57) ABSTRACT

A near-eye display system comprising an image source, a modulation stack, and an imaging assembly. The modulation stack, in one embodiment, comprises one or more digital light path length modulators.

20 Claims, 16 Drawing Sheets

Related U.S. Application Data continuation of application No. 15/335,298, filed on Oct. 26, 2016, now Pat. No. 10,187,634, which is a continuation-in-part of application No. 15/236,101, filed on Aug. 12, 2016, now Pat. No. 10,809,546.

(51) Int. Cl.
  *G02B 17/02* (2006.01)
  *H04N 13/383* (2018.01)
  *H04N 13/344* (2018.01)

(56) References Cited

U.S. PATENT DOCUMENTS

| | | | |
|---|---|---|---|
| 4,253,723 | A | 3/1981 | Kojima et al. |
| 4,670,744 | A | 6/1987 | Buzak |
| 5,610,765 | A | 3/1997 | Colucci |
| 5,751,243 | A | 5/1998 | Turpin |
| 6,134,031 | A | 10/2000 | Nishi et al. |
| 6,515,801 | B1 | 2/2003 | Shimizu |
| 6,580,078 | B1 | 6/2003 | O'Callaghan et al. |
| 7,023,548 | B2 | 4/2006 | Pallingen |
| 7,360,899 | B2 | 4/2008 | McGuire et al. |
| 7,798,648 | B2 | 9/2010 | Ijzerman et al. |
| 7,905,600 | B2 | 3/2011 | Facius et al. |
| 8,262,234 | B2 | 9/2012 | Watanabe |
| 8,755,113 | B2 | 6/2014 | Gardner et al. |
| 9,025,067 | B2 | 5/2015 | Gray et al. |
| 9,304,319 | B2 | 4/2016 | Bar-Zeev et al. |
| 9,494,805 | B2 | 11/2016 | Ward et al. |
| 9,588,270 | B2 | 3/2017 | Merrill et al. |
| 10,057,488 | B2 | 8/2018 | Evans et al. |
| 10,185,153 | B2 | 1/2019 | Eash et al. |
| 10,187,634 | B2 | 1/2019 | Eash et al. |
| 2001/0027125 | A1 | 10/2001 | Kiyomatsu et al. |
| 2002/0191300 | A1 | 12/2002 | Neil |
| 2003/0020925 | A1 | 1/2003 | Patel et al. |
| 2004/0156134 | A1 | 8/2004 | Furuki et al. |
| 2004/0263806 | A1 | 12/2004 | Silverstein et al. |
| 2005/0141076 | A1 | 6/2005 | Bausenwein et al. |
| 2006/0119951 | A1 | 6/2006 | McGuire, Jr. |
| 2007/0030456 | A1 | 2/2007 | Duncan et al. |
| 2007/0030543 | A1 | 2/2007 | Javidi et al. |
| 2007/0139760 | A1 | 6/2007 | Baker et al. |
| 2007/0146638 | A1 | 6/2007 | Ma et al. |
| 2008/0130887 | A1 | 6/2008 | Harvey et al. |
| 2008/0174741 | A1 | 7/2008 | Yanagisawa et al. |
| 2008/0205244 | A1 | 8/2008 | Kitabayashi |
| 2009/0021824 | A1 | 1/2009 | Ijzerman et al. |
| 2009/0046262 | A1 | 2/2009 | Okazaki et al. |
| 2009/0052838 | A1 | 2/2009 | McDowall et al. |
| 2009/0061505 | A1 | 3/2009 | Hong et al. |
| 2009/0061526 | A1 | 3/2009 | Hong et al. |
| 2009/0225420 | A1 | 9/2009 | Yao et al. |
| 2009/0237785 | A1 | 9/2009 | Bloom |
| 2009/0244355 | A1 | 10/2009 | Horie |
| 2011/0032436 | A1 | 2/2011 | Shimizu et al. |
| 2011/0075257 | A1 | 3/2011 | Hua et al. |
| 2011/0149245 | A1 | 6/2011 | Barth et al. |
| 2012/0075588 | A1 | 3/2012 | Suga |
| 2012/0113092 | A1 | 5/2012 | Bar-Zeev et al. |
| 2013/0010360 | A1 | 1/2013 | Ouderkirk et al. |
| 2013/0070338 | A1 | 3/2013 | Gupta et al. |
| 2013/0100376 | A1 | 4/2013 | Sawado |
| 2013/0222770 | A1 | 8/2013 | Tomiyama |
| 2013/0344445 | A1 | 12/2013 | Clube et al. |
| 2014/0168035 | A1 | 6/2014 | Luebke et al. |
| 2014/0176818 | A1 | 6/2014 | Watson et al. |
| 2014/0340588 | A1 | 11/2014 | Akiyama |
| 2015/0061976 | A1 | 3/2015 | Ferri |
| 2015/0153572 | A1 | 6/2015 | Miao et al. |
| 2015/0205126 | A1 | 7/2015 | Schowengerdt |
| 2015/0319342 | A1 | 11/2015 | Schowengerdt |
| 2016/0041390 | A1 | 2/2016 | Poon et al. |
| 2016/0041401 | A1 | 2/2016 | Suga |
| 2016/0077338 | A1 | 3/2016 | Robbins et al. |
| 2016/0131920 | A1 | 5/2016 | Cook |
| 2016/0195718 | A1 | 7/2016 | Evans |
| 2016/0225337 | A1 | 8/2016 | Ek et al. |
| 2016/0227195 | A1 | 8/2016 | Venkataraman et al. |
| 2016/0306168 | A1 | 10/2016 | Singh et al. |
| 2016/0381352 | A1 | 12/2016 | Palmer |
| 2017/0038579 | A1 | 2/2017 | Yeoh et al. |
| 2017/0068103 | A1 | 3/2017 | Huang et al. |
| 2017/0075126 | A1 | 3/2017 | Carls et al. |
| 2017/0097507 | A1 | 4/2017 | Yeoh et al. |
| 2017/0146803 | A1 | 5/2017 | Kishigami et al. |
| 2017/0160518 | A1 | 6/2017 | Lanman et al. |
| 2017/0227770 | A1 | 8/2017 | Carollo et al. |
| 2017/0269369 | A1 | 9/2017 | Zheng |
| 2018/0045973 | A1 | 2/2018 | Evans et al. |
| 2018/0045974 | A1 | 2/2018 | Eash et al. |
| 2018/0045984 | A1 | 2/2018 | Evans et al. |
| 2018/0048814 | A1 | 2/2018 | Evans et al. |
| 2018/0149862 | A1 | 5/2018 | Kessler et al. |
| 2018/0283969 | A1 | 10/2018 | Wang et al. |
| 2019/0007610 | A1 | 1/2019 | Evans et al. |
| 2019/0086675 | A1 | 3/2019 | Carollo et al. |
| 2019/0155045 | A1 | 5/2019 | Eash et al. |
| 2019/0174124 | A1 | 6/2019 | Eash et al. |

FOREIGN PATENT DOCUMENTS

| | | | |
|---|---|---|---|
| CN | 103765294 | A | 4/2014 |
| CN | 105739093 | A | 7/2016 |
| CN | 109997357 | A | 7/2019 |
| EP | 0195584 | A2 | 9/1986 |
| JP | 06-258673 | A | 9/1994 |
| JP | 3384149 | B2 | 3/2003 |
| WO | 2012/104839 | A1 | 8/2012 |
| WO | 2012/175939 | A1 | 12/2012 |
| WO | 2015/190157 | A1 | 12/2015 |
| WO | 2016/087393 | A1 | 6/2016 |

OTHER PUBLICATIONS

Extended European Search Report, EP 17840389.5, dated Mar. 20, 2020, 9 pages.
Final Office Action, U.S. Appl. No. 16/253,140, dated Feb. 12, 2020, 21 pages.
Hu et al., "High-resolution optical see-through multi-focal-plane head-mounted display using freeform optics," Optics Express, vol. 22, No. 11, Jun. 2014, pp. 13896-13903.
Hui, Wang, "Optical Science and Applications Series: Digital holographic three-dimensional display and detection", Shanghai Jiaotong University Press, Nov. 1, 2013, 4 pages.
Jun et al., "Industry Patent Analysis Report (vol. 32)—New Display", ISBN: 7513033447, Intellectual Property Publishing House Co., Ltd, Jun. 2015, 4 pages.
Lee et al., "Switchable Lens for 3D Display, Augmented Reality and Virtual Reality", Society for Information Display (SID), International Symposium Digest of Technical Papers, vol. 47, Issue 1, May 25, 2016, 4 pages.
Matjasec et al., "All-optical thermos-optical path length modulation based on vanadium-doped fibers", Optical Society of America, vol. 21, No. 10, May 2013, pp. 1-14.
Non Final Office Action, U.S. Appl. No. 16/253,140, dated May 29, 2020, 21 pages.
Notice of Allowance, U.S. Appl. No. 16/253,140, dated Jan. 27, 2021, 12 pages.
Pate, Michael, "Polarization Conversion Systems for Digital Projectors", Web Publication, Apr. 21, 2006, Downloaded from <http://www.zemax.com/os/resources/learn/knowledgebase/polarization-conver-sion-systems-for-digital-projectors> on Jun. 17, 2016, 8 pages.
PCT Search Report and Written Opinion PCT/US2017/46646, dated Dec. 5, 2017, 11 pages.
Polatechno Co., Ltd., "LCD Projector Components", Available Online at <http://www.polatechno.co.jp/english/products/projector.html>, downloaded on Jun. 17, 2016, 2 pages.

(56) References Cited

OTHER PUBLICATIONS

Sandner et al., "Translatory MEMS actuators for optical path length modulation in miniaturized Fourier-transform infrared spectrometers", MEMS MOEMS, vol. 7, No. 2, Apr.-Jun. 2008, pp. 1-11.
Second Office Action, CN App. No. 201780054575.3, dated Oct. 14, 2020, 22 pages (with English Translation).

NEAR-EYE DISPLAY SYSTEM

RELATED APPLICATIONS

The present invention is a continuation of U.S. patent application Ser. No. 16/253,140, filed on Jan. 21, 2019, issuing as U.S. Pat. No. 11,025,893 on Jun. 1, 2021, which is a continuation of U.S. patent application Ser. No. 15/335, 298, filed on Oct. 26, 2016, issued as U.S. Pat. No. 10,187, 634 on Jan. 22, 2019, which claims priority to U.S. patent application Ser. No. 15/236,101, filed on Aug. 12, 2016, issued as U.S. Pat. No. 10,809,546 on Oct. 20, 2020. All applications are incorporated herein by reference in their entirety.

FIELD

The present invention relates to a near-eye display system, and more particularly to a near-eye display system including a modulation stack.

BACKGROUND

Near-eye display systems are becoming more common. Such near-eye display systems attempt to provide a three dimensional display to the user. In the prior art, displays rendering multiple focal planes utilized mechanical movement such as gears or liquid lenses. Such mechanisms are expensive, slow, and relatively fragile. Another prior art method of displaying multiple focal lengths uses multiple mirrors and lenses.

Such prior art solutions are some combination of large, expensive, and slow. Liquid lenses are expensive and slow, and prior art beam splitters are large. This makes them difficult to use, and not useful for size or cost constrained systems, particularly near-eye display systems.

DETAILED DESCRIPTION

A near-eye display system utilizing a modulation stack is described. A modulation stack includes one or more digital light path length modulators, to adjust the path length of light. A digital light path length modulator can be used to create two focal planes. In one embodiment, using a modulation stack with a plurality of digital light path length modulators, the number of focal planes can be increased. Creating a display in which the 3D indicia of overlap, focus, and vergence match provides the capacity to build a system that can meet the physiological requirements of human vision. This produces a better quality 3D display than is currently possible and can prevent the discomfort associated with 3D displays.

The following detailed description of embodiments of the invention makes reference to the accompanying drawings. The drawings show various embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is not to be taken in a limiting sense, and the scope of the present invention is defined only by the appended claims.

Figure 1:
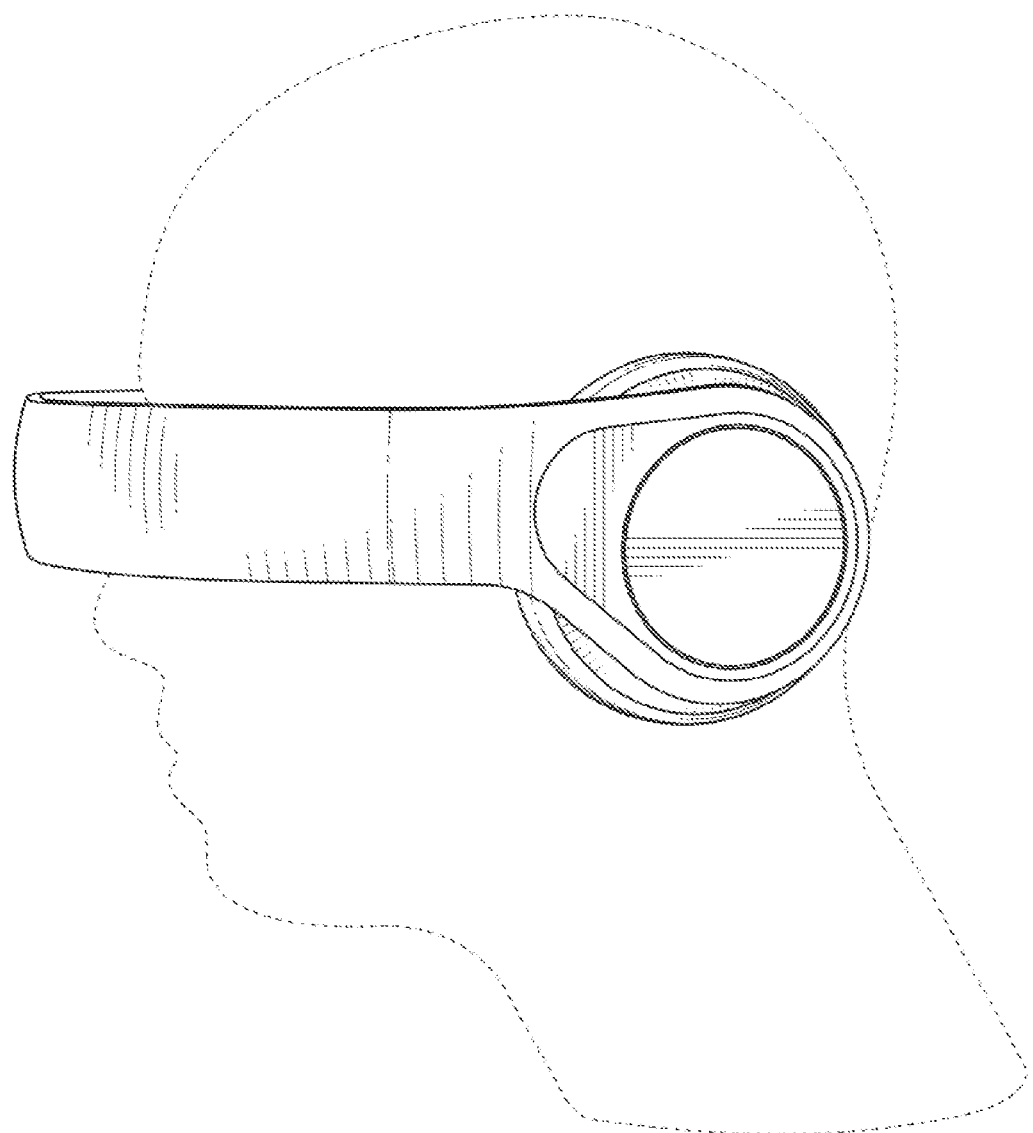
FIG. 1 is an illustration of one embodiment of a near-eye display system (NED), in which the present invention may be used.

FIG. 1 is an illustration of one embodiment of a near-eye display system, in which the present invention may be used. The near-eye display system, in one embodiment includes a head-mounted display, which includes a display for one or both eyes of a user. In one embodiment, the near-eye display system is a display mounted in another device, such as a camera, microscope display, focal assist in a microscope, telescope, digital scope, medical display system, rifle scope, range finder, etc. In one embodiment, the near-eye display system is coupled with a speaker system to enable the playing of audio-visual output such as movies. The near-eye display system may provide an opaque display, partially transparent display, and/or transparent display. The near-eye display system may provide augmented reality and/or virtual reality display.

Figure 2A:
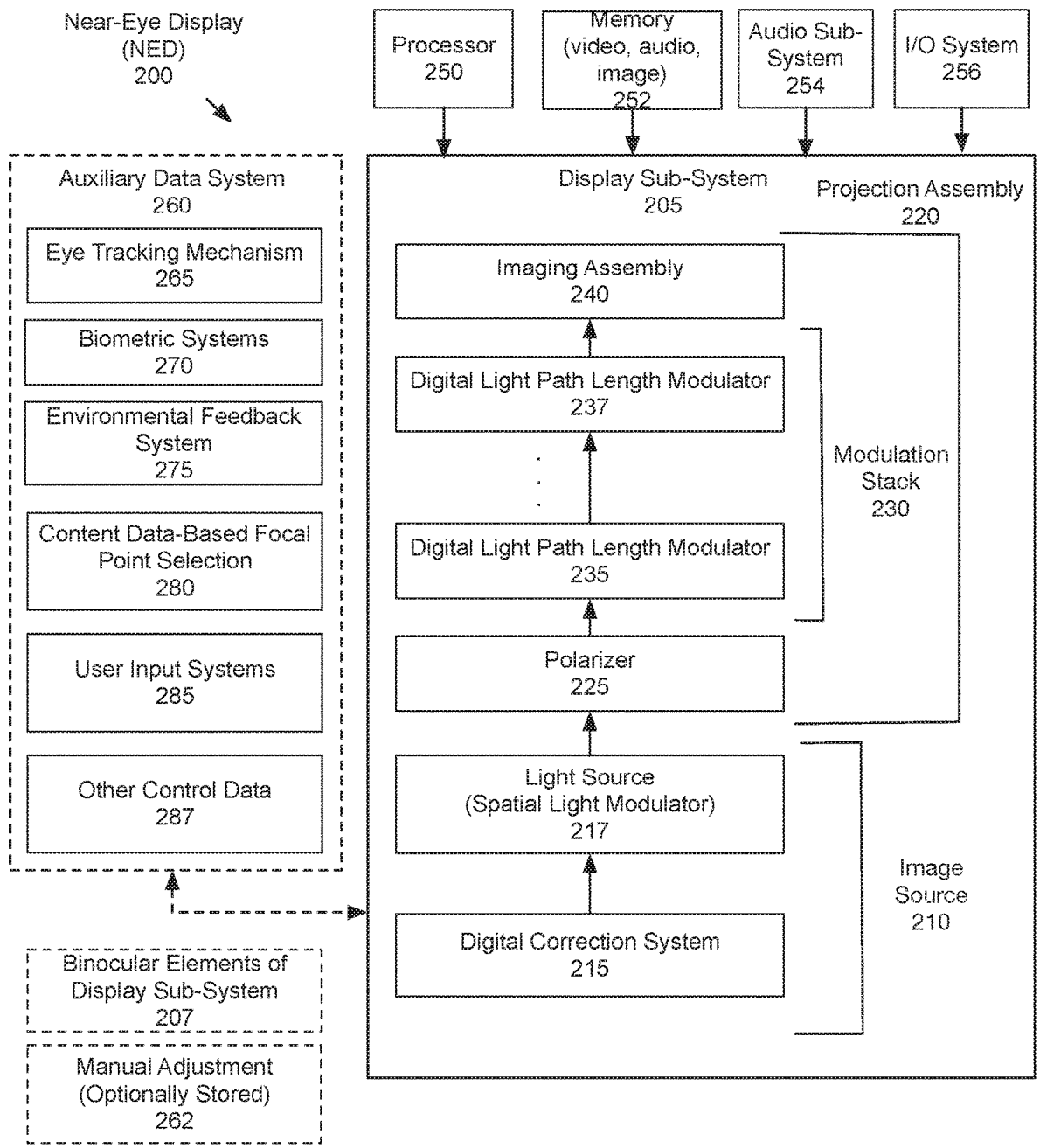
FIG. 2A is a block diagram of one embodiment of a near-eye display system.

FIG. 2A is a block diagram of one embodiment of a near-eye display system. The near-eye display system 200 includes, in one embodiment, a display subsystem 205, an audio subsystem 254, a processor 250, a memory 252, and optionally an auxiliary data system 260. The display subsystem 205 generates image data. Memory 252 may be a buffer-memory, enabling the near-eye display system 200 to stream content. The memory 252 may also store image and video data for display. I/O system 256 makes image, audio, video, VR, or other content available from other sources (e.g. enables downloading or streaming of content from various sources.)

The display subsystem 205 includes, in one embodiment, image source 210 and projection assembly 220. The image source 210 in one embodiment includes a light source 217, which in one embodiment is a spatial light modulator (SLM). The image source 210 in one embodiment also includes a digital correction system 215, to correct the output of the light source 217, to account for distortion in the projection assembly 220. In one embodiment, the light source 217 may be a real image, in which case the light source 217 is external to the system, and there is no digital correction. In one embodiment, the NED 200 may be used for one or more of virtual reality (digital image source), augmented reality (a combination of real and digital image source), and reality (real image source.)

The projection assembly 220 includes a polarizer 225 in one embodiment. The polarizer 225 passes through light with a particular polarization.

The projection assembly 220 includes a modulation stack 230. The modulation stack 230 includes one or more digital light path length modulators 235, 237. The digital light path length modulators 235, 237 alter the light path length based on the polarization of the light. In one embodiment, polarizer 225 may be positioned after modulation stack 230.

Imaging assembly 240 is used to display the image to the user. In one embodiment, the display subsystem 205 may include additional mechanical and optical elements which can provide correction or alteration of the image.

The system may include a binocular elements display subsystem 207. In one embodiment, the binocular elements display subsystem 207 may include only an imaging assembly, while the image source 210, polarizer 225, and modulation stack 230 may be shared between the display subsystem 205 and the binocular elements display subsystem 207. In another embodiment, the binocular elements display subsystem 207 may include more of the elements, including one or more of a separate polarizer, modulation stack, and image source.

In one embodiment, the system may receive data from auxiliary data system 260. The auxiliary data system may provide information for selecting the focal lengths. As noted above, the modulation stack 230 can create a perception of an image element at various virtual object distances. The auxiliary data system 260 may be used to select a virtual object distance, based on various factors.

One auxiliary data system 260 element is an eye tracking mechanism 265. The eye tracking mechanism 265 tracks the gaze vector of the user's eyes. In one embodiment, the system may place image elements in one or more selected locations based on where the user's eyes are looking, using the eye tracking mechanism 265. In one embodiment, the eye tracking mechanism 265 is an infrared optical sensor or camera to sense light reflected from the eye. Other techniques may be used for eye tracking. Eye tracking mechanism 265 may track one or both eyes.

Environmental feedback system 275 utilizes sensors to obtain data from the external environment. For example, the environmental feedback system 275 may identify the position of a wall, or window, or other targeted location or object, so data displayed by display subsystem 205 can have a virtual object distance appropriate for that target location. The environmental feedback system 275 may be a range sensor, camera, or other system.

Content data-based focal point selection 280 enables the system to selectively choose a virtual object distance, based on what is being displayed. For example, the system may selectively choose a portion of the image for focus.

User input systems 285 enable focus selection based on head tracking, gestures, voice control, and other types of feedback or input systems. Such user input systems 285 may include video game controllers, microphones, cameras, inertial measurement sensors, and other sensors for detecting user input.

In one embodiment, biometric systems 270 may also be used to detect the user's state, including the user's identity, emotional state, etc. In one embodiment, the biometric system 270 may be used to detect the user's vision correction, and provide adjustment based on the vision correction.

Other control data 287 may also be provided to the system. Any of this data from auxiliary data system 260 may be used to adjust the virtual object distance of one or more image elements. In one embodiment, in addition to auxiliary data system 260, the system may additionally accept manual adjustment 262. In one embodiment, the manual adjustment may be used to correct for the user's optical issues, which sets a baseline for the user. In one embodiment, the manual adjustment is stored so that a user may have a customized setting, which may be beneficial if the near-eye display system is shared.

In one embodiment, the near-eye display 200 may provide depth blending. In one embodiment, the system 200 enables depth blending between the focal lengths created using the modulation stack 230. Depth blending uses weighting of pixel values between adjacent planes, in one embodiment. This creates an appearance of continuous depth. In one embodiment, the weighting may be linear weighting. In one embodiment, nonlinear optimization techniques may be used. In one embodiment, the image source 210 adjusts the pixel values output, to create such depth blending.

Figure 2B:
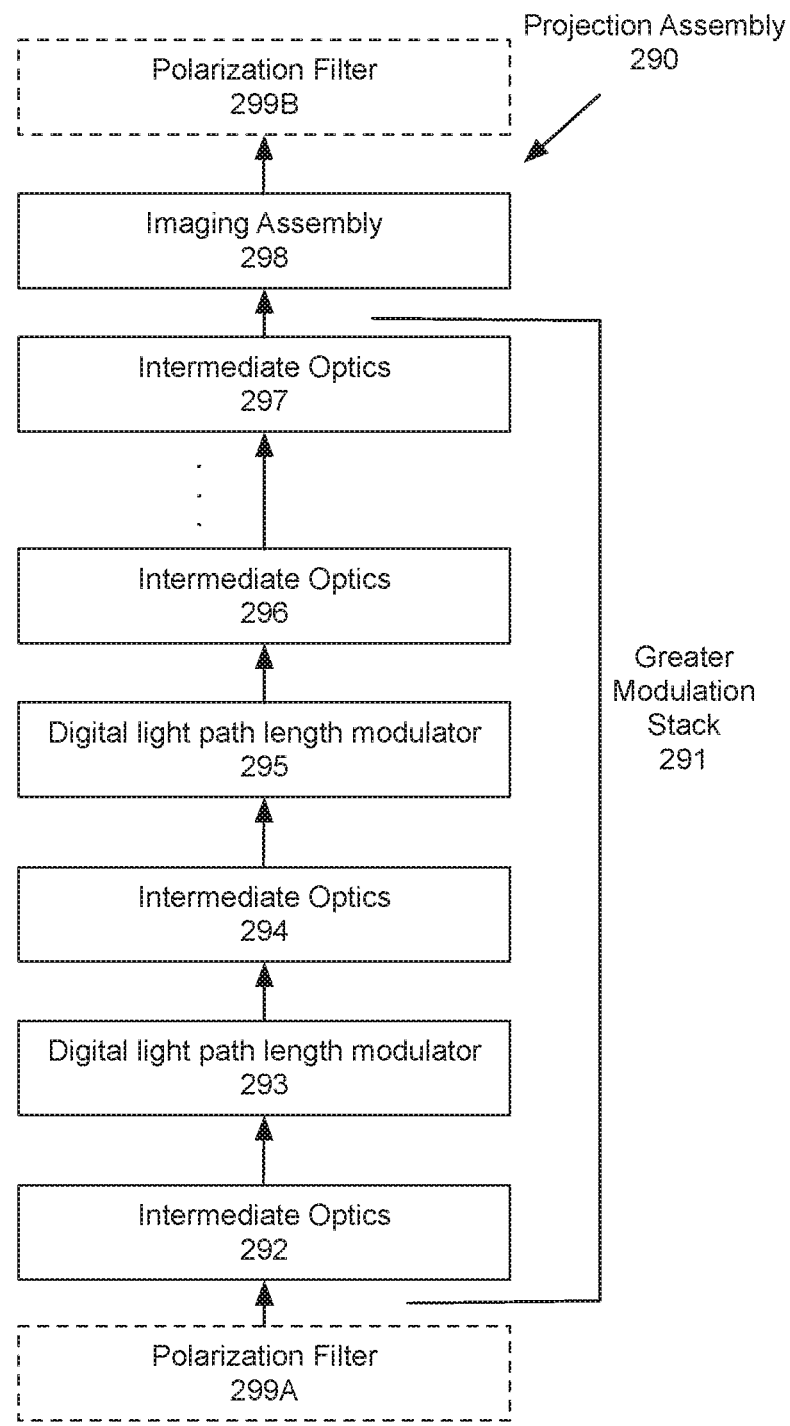
FIG. 2B is a block diagram of one embodiment of a projection assembly.

FIG. 2B is a block diagram of one embodiment of a projection assembly 290. The projection assembly 290, in one embodiment, includes a plurality of digital light path length modulators (293, 295) as well as a plurality of intermediate optics elements (292, 294, 296, 297) together forming a greater modulation stack 291. In one embodiment, the projection assembly in a real system may include 6-30 elements which include lenses, mirrors, apertures, and the like, referred to as intermediate optics. In one embodiment, the intermediate optics may be interspersed with the digital light path length modulators. In one embodiment, they may be positioned before and/or after the set of digital light path length modulators. In one embodiment, polarization filter 299 may be positioned before 299A or after 299B in the greater modulation stack 291.

In one embodiment, the projection assembly 290 may correct for chromatic aberration and other irregularities of optical systems.

Figure 3A:
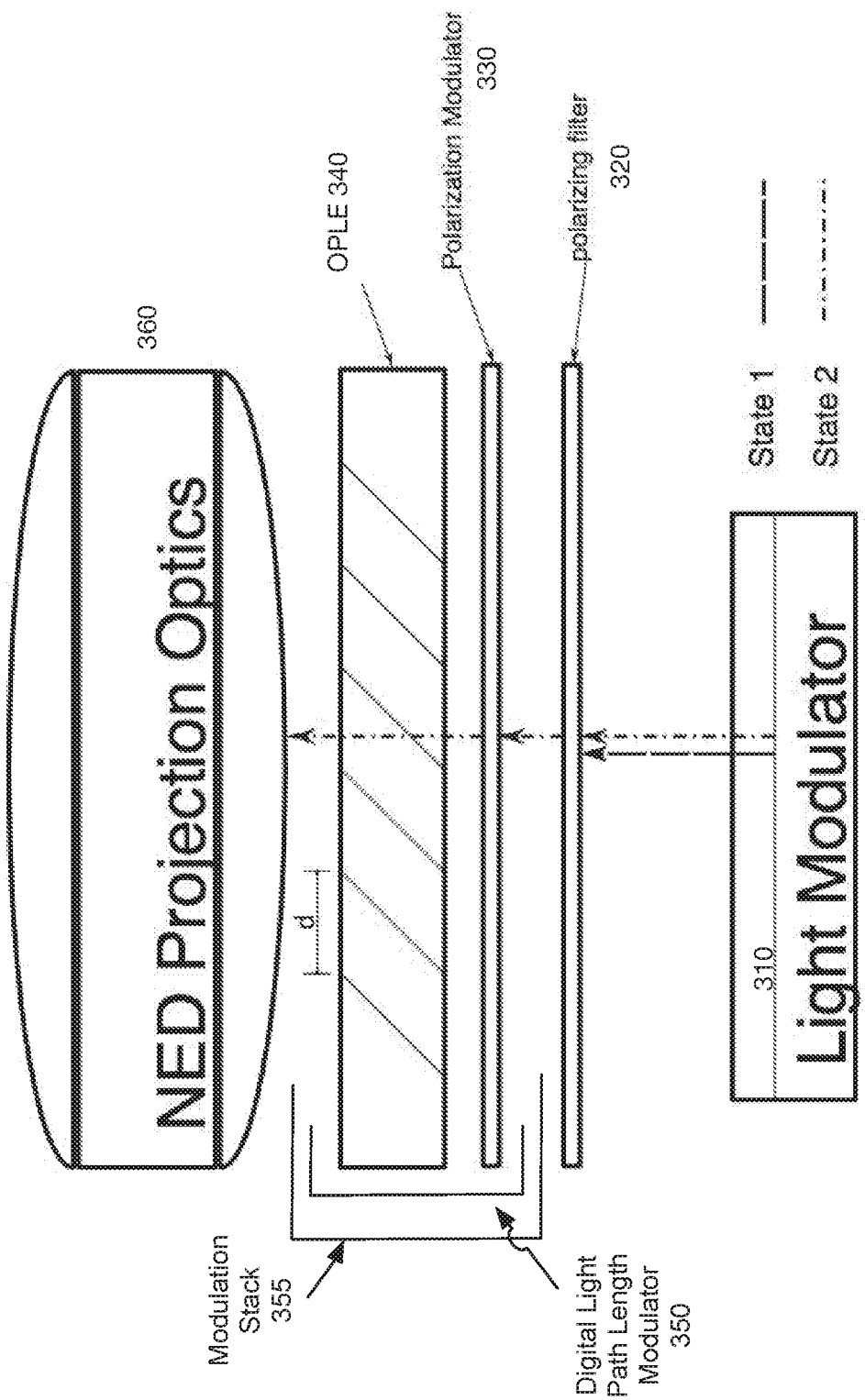
FIGS. 3A and 3B are diagrams of one embodiment of a digital light path length modulator in a near-eye display system.
Figure 3B:
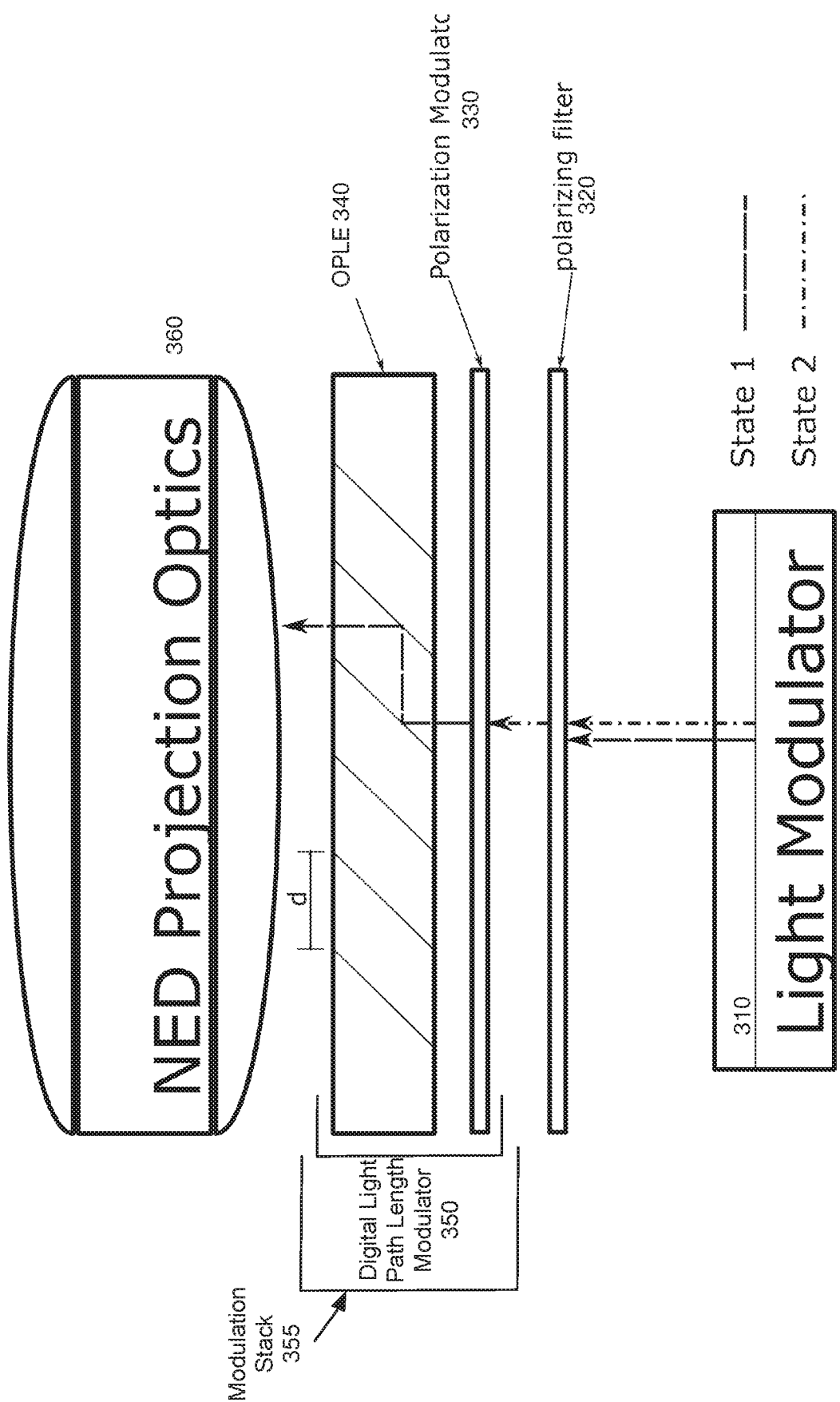

FIGS. 3A and 3B are diagrams of one embodiment of a near-eye display (NED) system including a modulation stack. The light modulator 310 outputs polarized light, both state 1 and state 2 polarized light, in one embodiment. Polarizing filter 320 removes the state 1 polarized light, and passes through state 2 polarized light only.

The modulation stack 355 includes one or more digital light path length modulators 350. For simplicity the illustration here includes a single digital light path length modulator 350. The digital light path modulator 350 includes a polarization modulator 330, which can rotate the polarization of light, and an optical light path extender (OPLE) 340 which selectively extends the light path length, based on the polarization of the light.

The polarization modulator 330 in FIG. 3A is "off," leaving the state 2 polarized light to pass through. In this context, the term "on" refers to a setting in which the polarization modulator 330 alters the polarization of light, while the term "off" refers to the setting in which the polarization modulator 330 does not alter the polarization of light.

The OPLE 340 has a plurality of polarization sensitive reflective elements, which reflect state 1 polarized light, while passing through state 2 polarized light. Here, state 2 polarized light is transmitted straight through. The output in one embodiment is transmitted to near-eye display (NED) projection optics 360. Though it is not shown, additional optical elements may be included in this system, including lenses, correction systems, etc.

FIG. 3B is a diagram of the near-eye display system of FIG. 3A with the polarization modulator "on." Here, again, the polarizing filter passes only state 2 polarized light. However, here, the polarization modulator 330 modulates the light, and outputs state 1 polarized light. The state 1 polarized light is reflected by the polarization sensitive reflective elements of OPLE 340. Thus, this light goes through a longer light path than the light with state 2 polarization, which is passed through without reflection.

A comparison of FIGS. 3A and 3B shows that the state 1 polarized light has a longer light path than the state 2 polarized light. In this way, a digital light path length modulator 350 can change the light path length. While only a single digital light path length modulator 350 is shown here, a plurality of digital light path length modulators 350 may be stacked to provide a larger number of light path lengths.

FIGS. 3A and 3B show a time sequential embodiment, in which all of the light entering the digital light path length modulator 350 has one polarization, and is either modulated or not modulated by polarization modulator 330. In this example, the system switches between the states shown in FIGS. 3A and 3B, in time. The polarization modulator 330 may selectively modulate the polarization of a subset of the light, in one embodiment. In one embodiment, modulation may be based on location, time, color, wavelength, and optionally other differentiable factors.

Figure 3C:
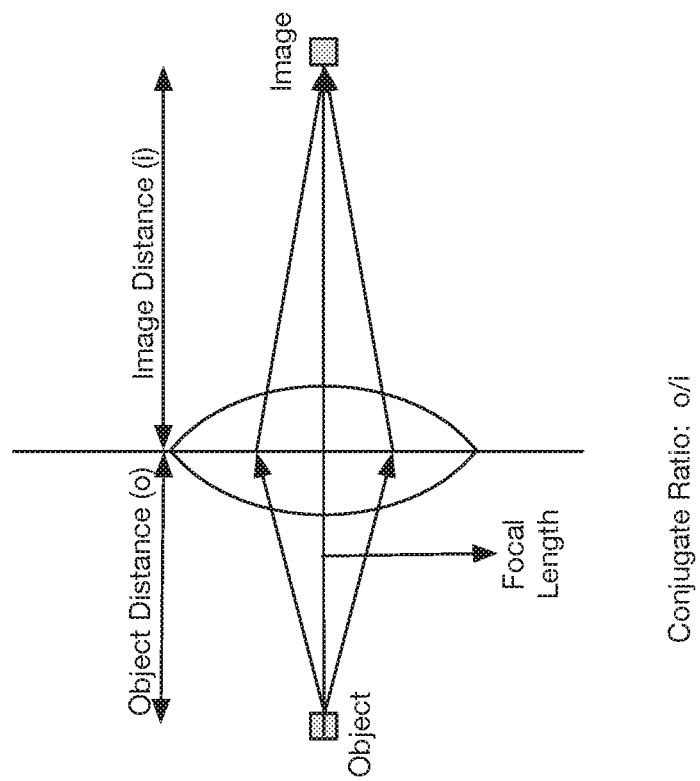
FIG. 3C is an optical diagram showing a relationship between focal length and conjugate ratio.

FIG. 3C illustrates one embodiment of a simple optical system to show a relationship between a focal length and conjugate ratio. The conjugate ratio is the ratio of object distance o to image distance I, along the principal axis of a lens or mirror. For an object at the focal point of a lens, the conjugate ratio is infinite. A combination of the focal length and conjugate ratio determines the virtual object distance of an image.

Figure 4:
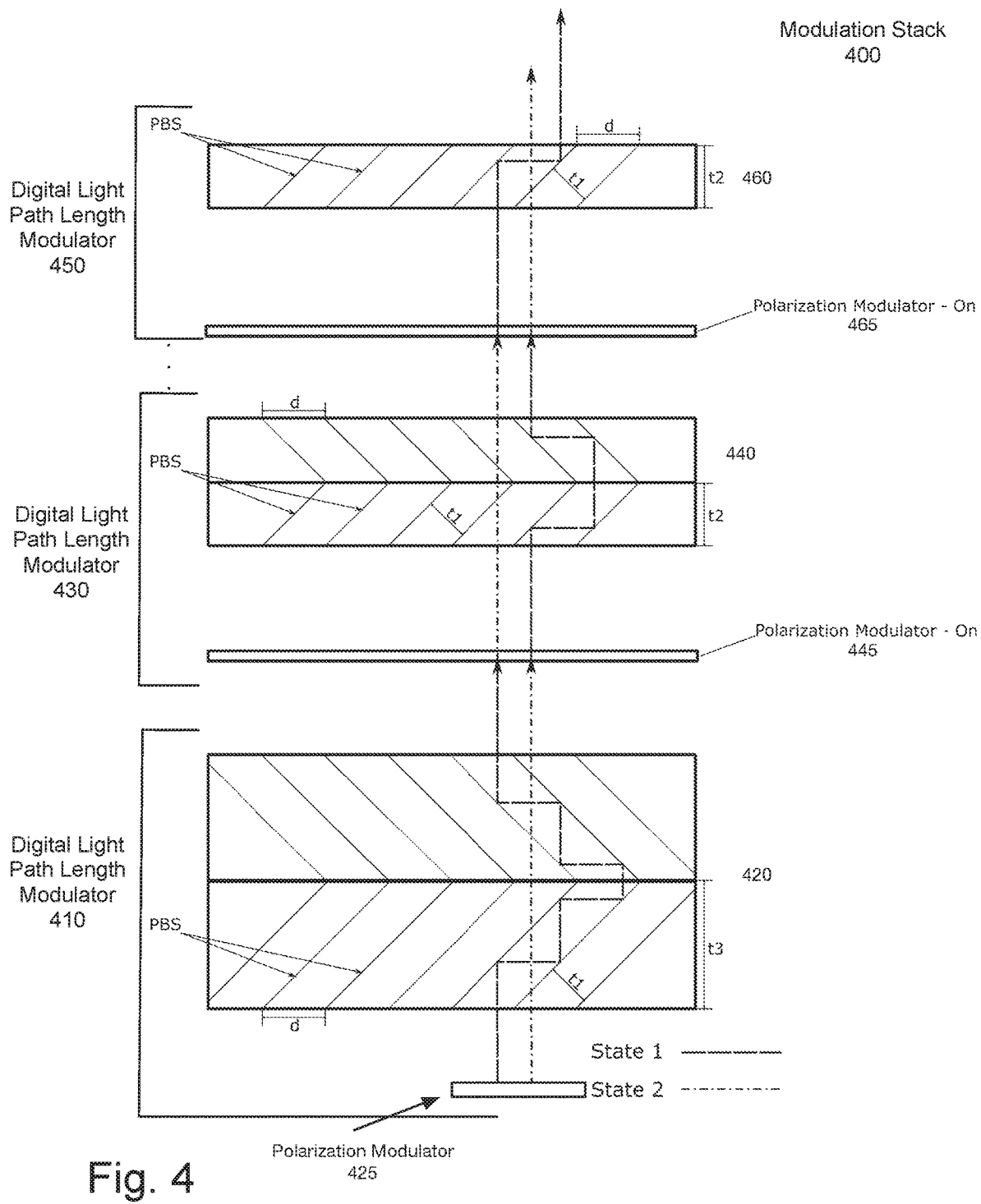
FIG. 4 is a block diagram of one embodiment of a modulation stack including a plurality of digital light path length modulators.

FIG. 4 illustrates one embodiment of a modulation stack 400 including three digital light path length modulators. Each of the digital light path length modulators 410, 430, 450 includes a polarization modulator and an OPLE. In this example, two of the OPLEs 420, 440 are self-aligned OPLEs.

Self-aligned OPLEs include two plates that adjust the spatial shift of the reflected light. The self-aligned OPLE 420 can be used to spatially realign the reflected and passed-through light. In one embodiment, the two plates are matched. In one embodiment, they may be matched by having the same thickness, t2, and mirror image polarization sensitive reflective elements. In one embodiment, two plates may be matched by having the spatial shift created by one of the plates with a particular thickness, and angle of the polarization sensitive reflective elements be matched by a second plate with a different thickness and/or angles, which is designed to provide a matching spatial shift. In one embodiment, the base material of the OPLE may change as well, with the materials having a different index of refraction, bifringence, and other properties.

In various embodiments, one or more of the following variations may be made: the material used to make the OPLE, effective thickness of the OPLEs may vary, as may the angles of the polarization sensitive reflective elements. The effective thickness of the OPLE is defined as the cumulative thickness of the one or more plates which make up the OPLE. Thus the effective thickness of OPLE 440 is different than the thickness of OPLE 460, even though the individual plates in the two OPLEs 440, 460 are identical.

With the shown set of three different OPLEs, the system can create up to eight ($2^3$) virtual object distances by selectively modulating the polarization, as follows:

| OPLE 1 | OPLE 2 | OPLE 3 |
| --- | --- | --- |
| State 1 | State 1 | State 1 |
| State 1 | State 1 | State 2 |
| State 1 | State 2 | State 1 |
| State 1 | State 2 | State 2 |
| State 2 | State 1 | State 1 |
| State 2 | State 1 | State 2 |
| State 2 | State 2 | State 1 |
| State 2 | State 2 | State 2 |

Figure 5A:
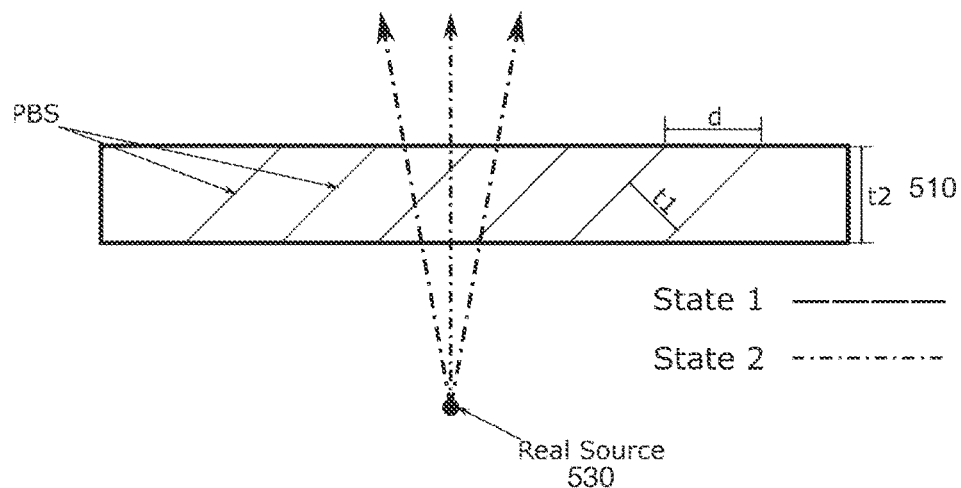
FIG. 5A illustrates one embodiment of the effect of using an OPLE with light having a first polarization.

FIG. 5A illustrates one embodiment of the effect of using an OPLE 510, with a light source for non-reflected light. The light source is real source 530. As can be seen, in this example, for state 2 polarized light which is not reflected by the polarization sensitive reflective elements, the real light source 530 and the "virtual" or perceived light source are in the same position. This figure additionally shows that for a real light source 530, light travels in a cone, rather than a straight light as is usually illustrated for simplicity.

Figure 5B:
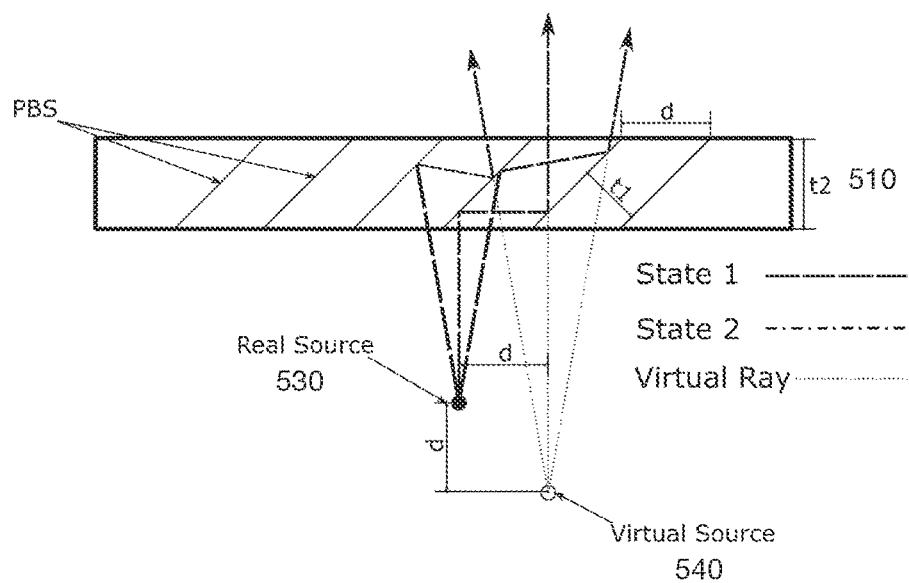
FIG. 5B illustrates one embodiment of the effect of using the OPLE of FIG. 5A, with light having a second polarization.

FIG. 5B illustrates one embodiment of the effect of using the OPLE 510 of FIG. 5A, with a light source for reflected light. In this illustration, state 1 polarized light is reflected. Thus, the user's perceived "virtual light source" 540 is spatially shifted from the real light source 530. The lengthening of the light path shifts the virtual source vertically, while the movement of the light caused by the bounce shifts the apparent light source horizontally. In the example shown, the virtual light source is shifted to the right and back. The virtual rays show that the user's perception tracks back the light, to perceive the virtual source.

Figure 5C:
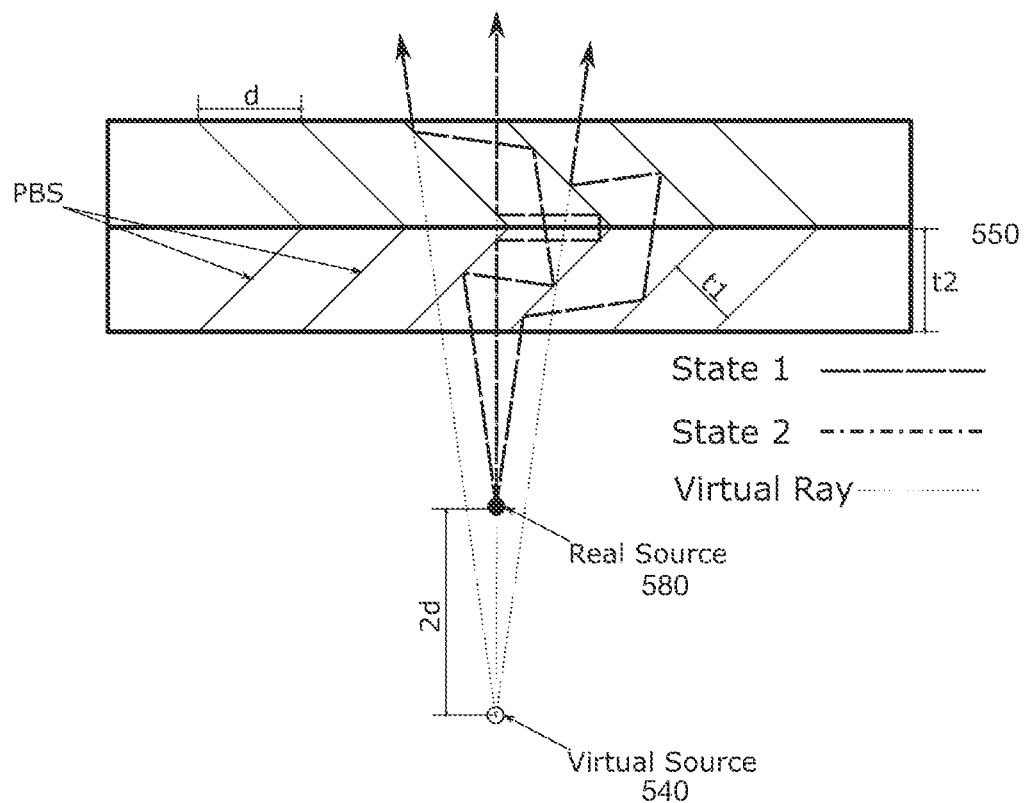
FIG. 5C illustrates one embodiment of the effect of using a self-aligned OPLE, with light having a second polarization.

FIG. 5C illustrates one embodiment of the effect of using a self-aligned OPLE 550, with a light source, for reflected light. As can be seen, by using the self-aligned OPLE 550, the virtual light source 540 appears to be further away (e.g. lengthening the virtual object distance) from the real source 580, but not shifted in position. Although the self-aligned OPLE 550 shown in FIG. 5C has no gap between the plates, a gap, including a gap with additional optical elements, could continue to provide this self-alignment feature. Furthermore, while the two plates in the shown self-aligned OPLE 550 are matched, they need not have an identical thickness or angle for the polarization sensitive reflective elements, as discussed above.

Figure 5D:
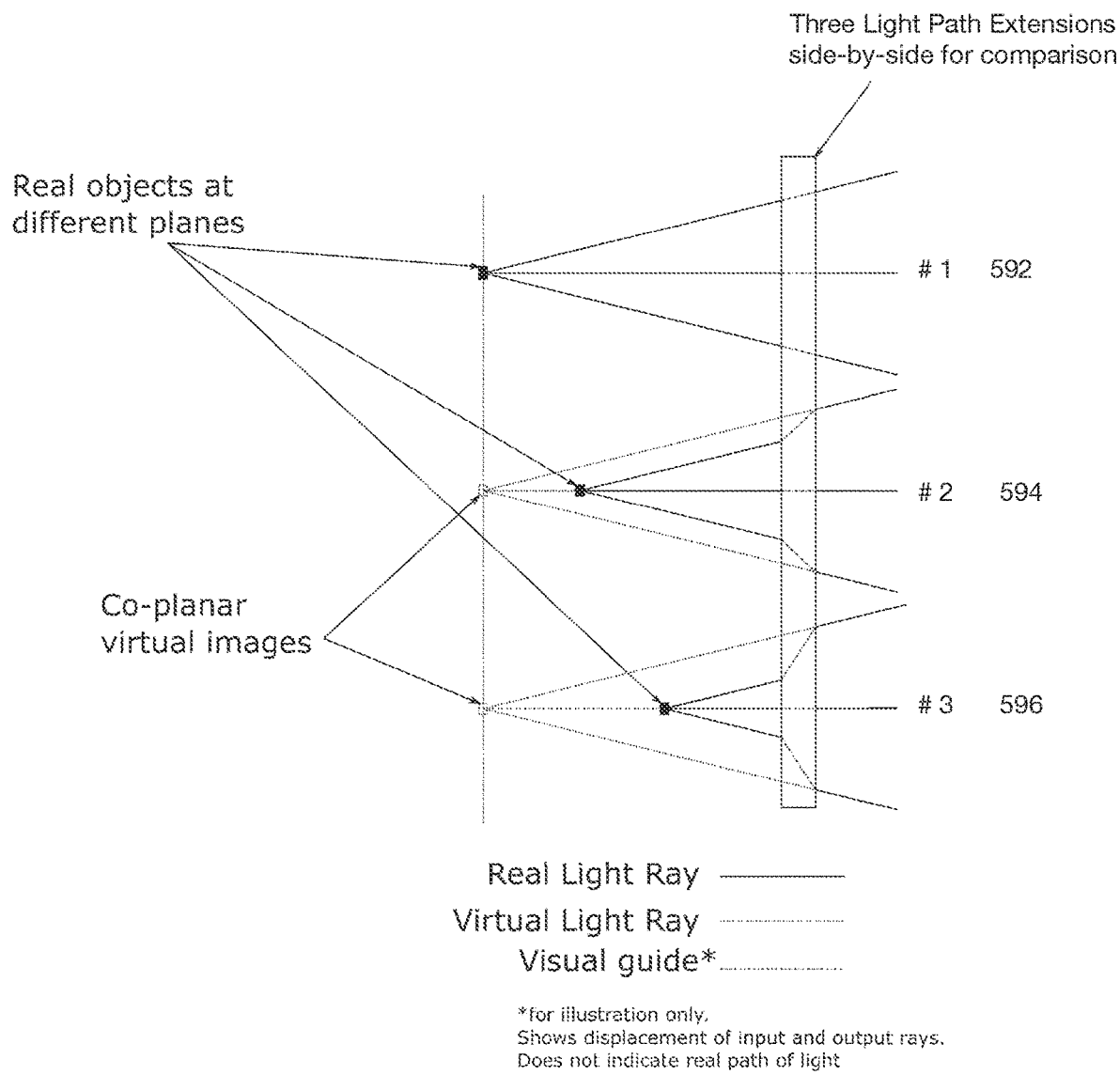
FIG. 5D illustrates an example of light path extensions and the effect on a virtual object distance.

FIG. 5D shows the effect of light extension, on a perceived image. The illustration shows three degrees of light extension side by side, for comparison. The first one passes the light without any lengthening, so the image is perceived at the focal plane of the display. The second one lengthens the light path, which causes the user to perceive the image at a different focal plane. The third one lengthens the light path further, which causes the user to perceive a virtual image at a third focal plane. Thus, by controlling the length of the light extension, a system can create virtual images and image elements at various focal points. Using the digital light path length modulator, the system can adjust the light path digitally, and selectively position virtual images at various virtual object distances.

Figure 5E:
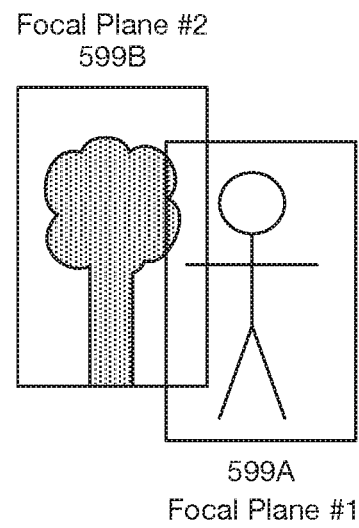
FIG. 5E illustrates an example of image elements in two focal planes.

FIG. 5E illustrates one embodiment of the capability of displaying a single frame including image elements at a plurality of virtual object distances, producing a multi-focal light display. In this example, the stick figure in focal plane 1 599A and the tree in focal plane 2 599B are perceived at different virtual object distances, though they are part of the same image frame. This can be done on a time sequential basis or on a per pixel basis, as will be discussed in more detail below.

Figure 6:
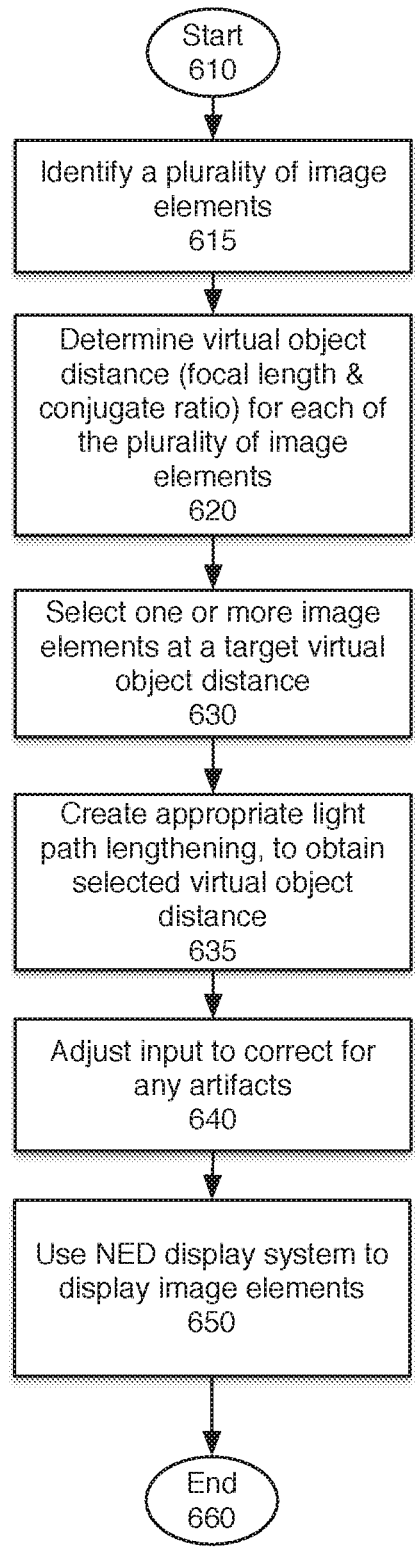
FIG. 6 is a flowchart of one embodiment of using the near-eye display system including multiple virtual object distances.

FIG. 6 is a flowchart of one embodiment of using the near-eye display system including multiple focal planes. The process starts at block 610.

At block 615, a plurality of image elements are identified. In one embodiment, the image includes at least two elements. In another embodiment, any particular frame or image may include only a single image element.

At block 620, the preferred virtual object distance is determined for each of the plurality of image elements. The virtual object distance is the perceived focal length of the image element to the user. The virtual object distance is defined by the focal length and conjugate ratio.

At block 630, one or more of the image elements are associated with one or more target virtual object distances.

At block 635, the appropriate light path lengths are created, using the modulation stack, as described above, for the selected virtual object distance. In one embodiment, the modulation may be time-based and/or pixel-based.

At block 640, the input is adjusted to correct for any artifacts created by the modulation stack. As noted above, the modulation stack may create lateral movement that is not intended. The digital correction system may adjust the light source to correct for such effects.

At block 650, the NED display system is used to display the image elements at a plurality of positions. The process then ends. In a real system, the process is continuous, as long as the NED is being used, with each frame, or sub-portion of a frame processed as described above.

Figure 7:
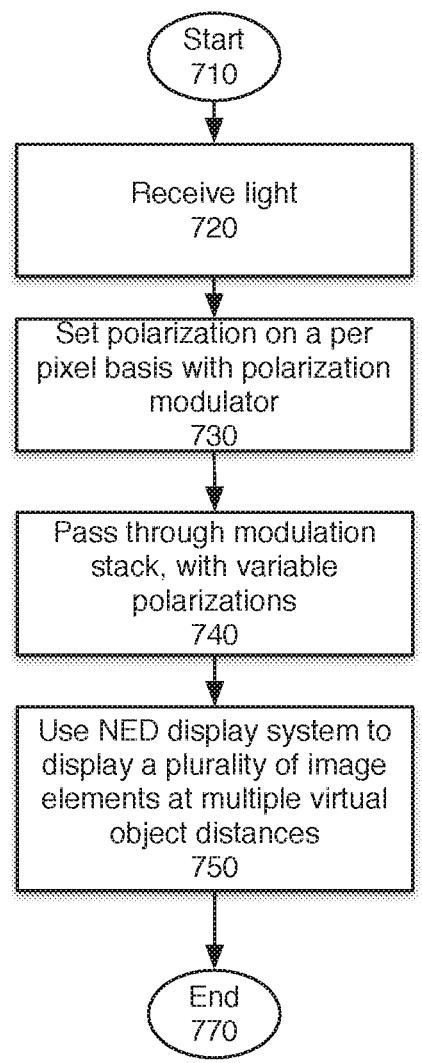
FIG. 7 is a flowchart of one embodiment of using the near-eye display system with spatial adjustments of light path length.

FIG. 7 is a flowchart of one embodiment of using the near-eye display system with spatial adjustments of light path length. Spatial adjustment in this context means that the virtual object distances are adjusted on a per pixel basis. Though the term "per pixel" is used, this does not necessarily refer to a pixel being a particular size, and the modulation may be on a per "zone" basis, where the zone is a portion of the frame being displayed. For some frames, the zone may be the entire frame. The size of the zone that is adjusted may range from a 1 pixel by 1 pixel area to a much larger area, including the entirety of a frame. However, within a single frame passed through, the system may create multiple virtual object distances. The process starts at block 710.

At block 720, polarized light with both types of polarization is received. In one embodiment, this is S-type polarization and P-type polarization.

At block 730, polarization is set on a per pixel basis, using the polarization modulator. This means, utilizing the OPLE discussed above, that on a per-pixel basis the light takes the longer or shorter path.

At block 740, the light is passed through the modulation stack. As noted above, the polarization of some or all of the light may change multiple times as it passes through the modulation stack. This adjusts the light path length for the light, on a per pixel basis.

At block 750, the NED display system displays the image at the plurality of virtual object distances. The process then ends at block 770. As noted above, in a real system, the process is continuous, as long as the NED is being used, with each frame processed as described above.

Figure 8:
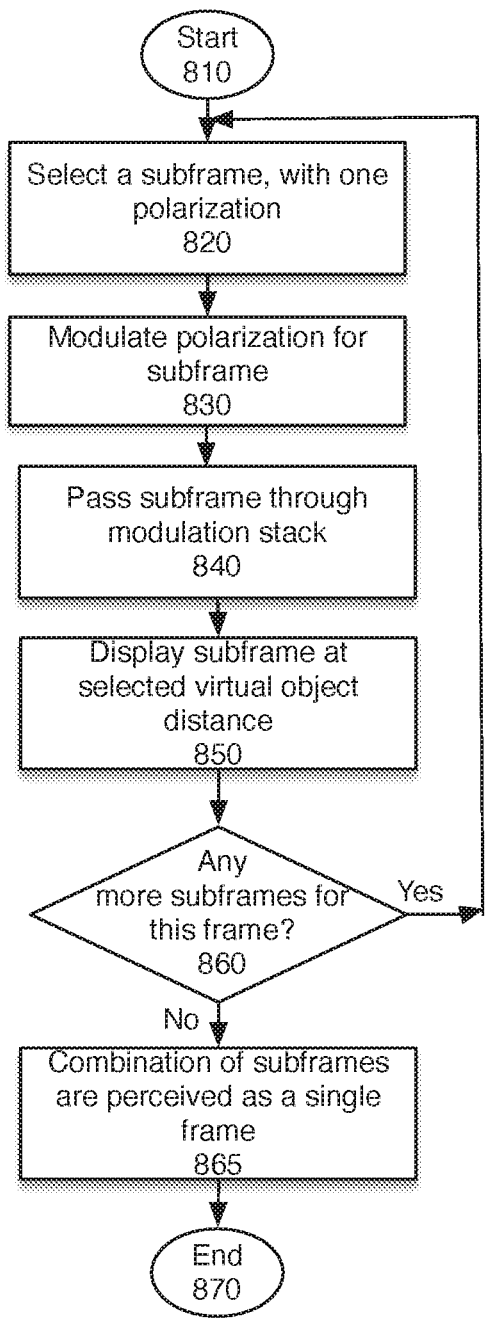
FIG. 8 is a flowchart of one embodiment of using the near-eye display system with time sequential adjustments of light path length.

FIG. 8 is a flowchart of one embodiment of using the near-eye display system with time sequential adjustments of light path length. Time sequential adjustment utilizes the rapid display of a plurality of subframes, each subframe including one or more image elements at a particular virtual object distance. The plurality of subframes create a single perceived frame, with a plurality of image elements at a plurality of virtual distances, adjusting the virtual object distances of the image portions sufficiently rapidly that the user cannot perceive it. This is referred to as biological real time. The process starts at block 810.

At block 820, a subframe is selected, with a particular polarization. In one embodiment, a subframe defines the image elements at a particular virtual object distance. In one embodiment, a polarization filter is used. In one embodiment, a single visual frame is made up of one or more subframes, where each subframe represents a virtual object distance.

At block 830, polarization is modulated for the subframe. Polarization is modulated for the entire subframe, using the polarization modulator.

At block 840, the subframe is passed through the modulation stack. The length of the light path can be set by altering the polarization using the polarization modulators between the OPLEs for the whole subframe, as it passes through the modulation stack.

At block 850, the subframe is displayed at a particular virtual object distance, based on the passage of the light through the modulation stack.

At block 860, the process determines whether there are any more subframes that are part of this frame. If so, the process returns to block 820 to select the next subframe to add to the image. The subframes are displayed in a way that enables the perception of the sequence of subframes as a single frame, including multiple virtual object distances. The process then ends at block 870. As noted above, in a real system, the process is continuous, as long as the NED is being used, with each subframe processed as described above.

Figure 9:
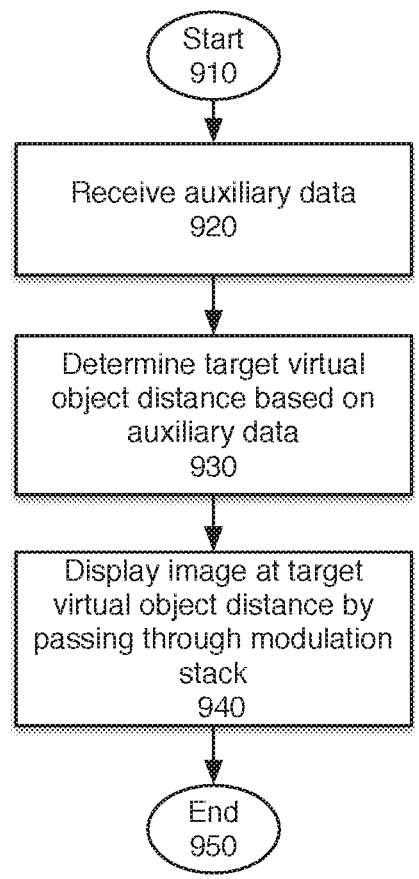
FIG. 9 is a flowchart of one embodiment of using the near-eye display system with variable adjustment of light path length, based on auxiliary data.

FIG. 9 is a flowchart of one embodiment of using the near-eye display system with variable adjustment of light path length, based on auxiliary data. The process starts at block 910.

At block 920, auxiliary data is received. Auxiliary data may include eye tracking data (showing the user's current gaze vector), environmental sensors (identifying a position of a wall or other surface for the image), key object identification (selecting a key object to be in the focal plane for the user), user input, and other external factors which may alter the selection of the virtual object distance for an image element or subframe.

At block 930, the virtual object distance for one or more image elements is identified, based on the auxiliary data. This may be where the user is looking, or where the system wants the user to look, for example the location of an external object which is a proper focus for an image for an augmented reality type display.

At block 940, the image element is displayed at the designated virtual object distance. This is done by passing the image elements through the modulation stack, and adjusting the light path length to place the image element at the desired virtual object distance.

The process then ends at block 950. As noted above, in a real system, the process is continuous, as long as the NED is being used.

Figure 10:
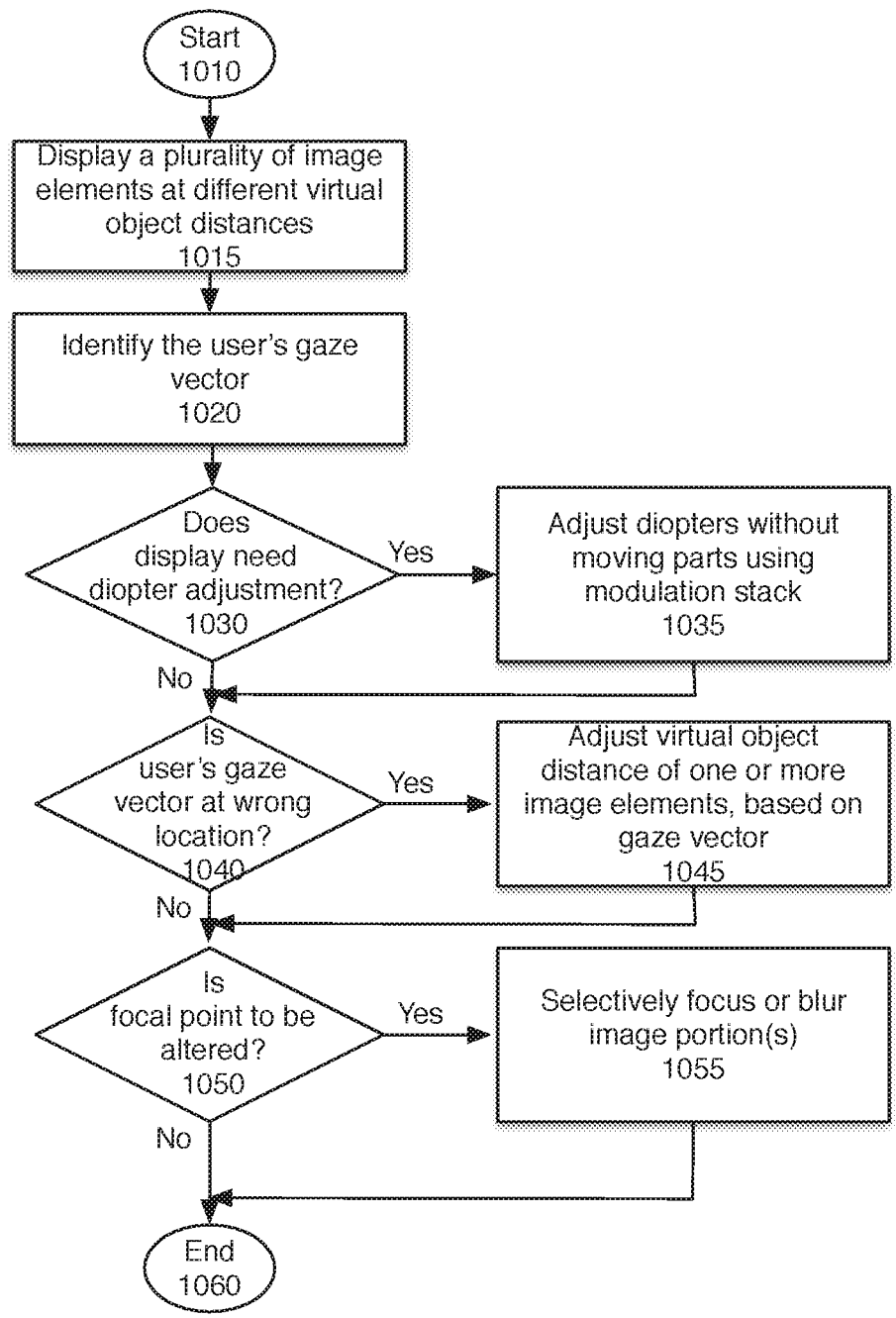
FIG. 10 is a flowchart of one embodiment of using dynamic focal planes using eye tracking for feedback.

FIG. 10 is a flowchart of one embodiment of using dynamic focal planes using eye tracking for feedback. The process starts at block 1010.

At block 1015, a plurality of image elements are displayed at various focal planes. At block 1020, the user's gaze vector is identified. Gaze vector is the direction and angle of the gaze of the user. This is one type of output of an eye tracking system.

At block 1030, the process determines whether the display needs diopter adjustment. In one embodiment, this may be done based on user input, or calibration with the user. If so, at block 1035, the virtual object distances are adjusted, using the modulation stack, without the use of moving parts. In one embodiment, the process may use controlled diopter steps for adjustment.

At block 1040, the process determines whether the user's gaze vector is directed at the "wrong" location. Wrong in this context means that the gaze vector indicates that the user's point of focus is not on the portion of the frame that he or she is meant to be focused on. This may be determined based on eye tracking, or other auxiliary information. If so, at block 1045 the virtual object distances, and locations optionally, of one or more image elements are adjusted. As noted above, this may be done by adjusting the modulation stack, so that those image elements are placed in a different focal plane.

At block 1050, the process determines whether the focal point is to be altered, based on auxiliary information. If so, at block 1055, the system selectively focuses or blurs image portions. This may be done by actually blurring, or by placing the "blurred" portions into a different image plane, which is further from the user's focus to effectively blur the element.

The process then ends at block 1060. As noted above, in a real system, the process is continuous, as long as the NED is being used. Additionally, while a flowchart format is used for this Figure, the individual elements need not be in any particular order, and the system can function equally well with a subset of these potential adjustments.

In this way, a near-eye display system provides a highly adjustable multi-focus display, using a modulation stack. Because the light path length is digitally controlled using the polarization modulator, the change in the virtual object distance may be accomplished extremely quickly. This also enables the system to use time-based alteration of the focal plane, through the same modulation stack. Alternatively, the system may use pixel-based selection of focal length, or variable focal length. This system may be used in near-eye display systems ranging from the headphone configured display system shown in FIG. 1, to camera view finders, rifle scopes, binoculars, and any other near-eye display type systems.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A near-eye display system to display an image to a user comprising:
    an image source to provide light;
    a modulation stack to output light via a first light path and a second light path, the first light path and the second light path having different light path lengths, the light path lengths modulated by a digital signal;
    an imaging assembly to display a plurality of image portions at a plurality of virtual object distances, from the light output by the modulation stack;
    a binocular elements display subsystem to provide binocular elements, the binocular elements display subsystem providing a second plurality of image portions at the plurality of virtual object distances for display to a second eye; and
    an auxiliary data system to receive external data and use the external data to adjust the virtual object distance of one or more image elements;
    the near-eye display system configured to provide a binocular display providing vergence distance cues to create a realistic three-dimensional image.

2. The system of claim 1, wherein the modulation stack comprises one or more digital light path length modulators, a digital light path length modulator comprising:
    a polarization modulator to receive light and to selectively modulate a polarization of the light; and
    a unitary optical path length extender (OPLE) to direct the light having a first polarization through a first light path through the OPLE, and to direct the light having a second polarization through a second light path through the OPLE, the first and the second light paths having different light path lengths.

3. The system of claim 1, further comprising:
    a focal point selector to select an image portion and selectively focus or blur image elements outside the selected image portion.

4. The system of claim 3, wherein the auxiliary data system comprises:
    an eye tracking mechanism to track a user's eye; and
    the system to automatically adjust the light path length to place the selected image portion at a determined virtual object distance, based on data from the eye tracking mechanism.

5. The system of claim 1, further comprising:
    the auxiliary data system to identify a key object to be in a focal plane for the user; and
    the near-eye display system configured to determine the virtual object distance for a plurality of elements in the image, wherein the key object is selected to be in a focal plane.

6. The system of claim 1, further comprising:
    the auxiliary data system to identify a position of a surface for the image in an augmented reality display; and
    the near-eye display system configured to determine the virtual object distance for a plurality of elements in the image, wherein the surface is selected to be in a focal plane.

7. The system of claim 1, wherein the modulation stack magnifies a portion of the image.

8. A method to display an image to a user comprising:
    receiving light from an image source;
    modulating the light from the image source using a modulation stack to output light via a first light path and a second light path, the first light path and the second light path having different light path lengths, the light path lengths modulated by a digital signal;

displaying a first plurality of image portions with a first plurality of light path lengths from the light output by the modulation stack to a user's first eye;

displaying a second plurality of image portions with a second plurality of light path lengths to a user's second eye, to provide binocular elements; and receiving external data at an auxiliary data system, and adjusting the light path lengths of one or more image elements;

wherein the method provides a binocular display providing a three-dimensional image.

9. The method of claim 8, wherein the modulation utilizes a modulation stack comprising one or more digital light path length modulators, and a digital light path length modulator:

modulates a polarization of the light using a polarization modulator; and directs light having a first polarization through the first light path through an optical path length extender (OPLE), and directs the light having a second polarization through the second light path through the OPLE, the first and second light paths having the different light path lengths.

10. The method of claim 8, further comprising:
selecting an image portion; and
selectively focusing or blurring image elements outside the selected image portion.

11. The method of claim 10, further comprising:
tracking, by an eye tracking mechanism, a user's eye; and
automatically adjusting one or more of the plurality of the light path lengths to place the selected image portion at a determined virtual object distance, based on data from the eye tracking mechanism.

12. The method of claim 8, further comprising:
identifying a key object to be in a focal plane for the user; and
determining a virtual object distance for a plurality of elements in the image such that the key object is in a focal plane, and adjusting the plurality of light path lengths to place the key object in the focal plane.

13. The method of claim 8, further comprising:
identifying a position of a surface for the image in an augmented reality display; and
determining a virtual object distance for a plurality of elements in the image, wherein the surface is selected to be in a focal plane.

14. The method of claim 8, wherein the modulation stack magnifies a portion of the image.

15. A near-eye display system to display an image to a user comprising:

an auxiliary data system to receive external data and use the external data to adjust a virtual object distance of one or more image elements;

a modulation stack to output light via a first light path and a second light path, the first light path and the second light path having different light path lengths, the light path lengths modulated by a digital signal; and an imaging assembly to display a plurality of image portions at a plurality of virtual object distances, from the light output by the modulation stack;

the near-eye display system configured to provide a binocular display providing vergence distance cues to create a realistic three-dimensional image.

16. The near-eye display system of claim 15, wherein the auxiliary data system comprises an eye tracking mechanism.

17. The near-eye display system of claim 15, wherein the auxiliary data system comprises an environmental feedback system providing data about a position of an external element for positioning the image.

18. The near-eye display system of claim 15, wherein the auxiliary data system comprises a focal point selector based on image content.

19. The near-eye display system of claim 15, wherein the auxiliary data system comprises a user input system.

20. The near-eye display system of claim 15, wherein the modulation stack is used to magnify a portion of the image.

* * * * *